United States Patent [19]

Gombar et al.

[11] 4,007,051
[45] Feb. 8, 1977

[54] COMPOSITION AND PREPARATION OF A DRY PREDISPERSED COATED PIGMENT

[75] Inventors: Oscar J. Gombar, Princeton; James Howard, Somerset, both of N.J.

[73] Assignee: Cities Service Company, Tulsa, Okla.

[22] Filed: Feb. 9, 1976

[21] Appl. No.: 656,567

Related U.S. Application Data

[63] Continuation-in-part of Ser. No. 554,365, March 3, 1975, abandoned.

[52] U.S. Cl. .......................................... 106/308 Q
[51] Int. Cl.$^2$ .......................................... C09C 3/08
[58] Field of Search ....................... 106/308 Q, 309

[56] References Cited

UNITED STATES PATENTS

| | | | |
|---|---|---|---|
| 3,296,001 | 1/1967 | Ambler et al. | 106/308 Q |
| 3,437,503 | 4/1969 | Massam et al. | 106/309 |
| 3,458,804 | 7/1969 | Wolf et al. | 106/309 |
| 3,615,812 | 10/1971 | Clark et al. | 106/309 |
| 3,712,824 | 1/1973 | Kiyokawa | 106/309 |

*Primary Examiner*—James E. Poer
*Attorney, Agent, or Firm*—George L. Rushton

[57] ABSTRACT

A dry predispersed coated pigment, immediately suitable for mixing in an ink system without milling, is prepared by
  a. mixing at least 90 parts of a pigment (e.g. carbon black) and not more than about 10 parts of a hydrocarbon natural fossil resin, solvent-extracted from coal,
  b. fusing the mixture,
  c. milling the mixture to obtain the approximate particle size distribution of the original pigment, and
  d. densifying or beading the mixture.

The product having this composition and prepared by this process is a dry pigment suitable for simple mixing with an ink system to give a ready-to-use printing ink.

8 Claims, No Drawings

COMPOSITION AND PREPARATION OF A DRY PREDISPERSED COATED PIGMENT

CROSS-REFERENCE TO RELATED APPLICATION

This application is a continuation-in-part of copending application serial Number 554,365, filed March 3, 1974, and now abandoned.

BACKGROUND OF THE INVENTION

This invention relates to pigment compositions useful in preparing printing inks, paints, and colored plastics. More particularly, the invention relates to a dry predispersed coated pigment composition that is immediately suitable, after simple mixing in an ink system, without milling, to give a ready-to-use printing ink. The invention also relates to a method of preparing the composition.

Prior art pigments contain, for typical black printing inks, about 20% carbon black, plus vehicle and resin (or binder), in a wet form. Usually, such a mixture is milled, such as on a 3-roll mill, for some time to obtain a well-dispersed mixture. This expensive and time-consuming milling is a major disadvantage in the present-day ink industry. Another method, according to U.S. Pat. No. 3,712,824, involves admixing, with agitation, a water slurry of a pigment with an oil-in-water emulsion containing a varnish. The mixture of organic liquid, resin and pigment is then dried, to form a dispersible pigment.

In contrast to the disadvantages found in preparing the prior art printing ink products, the present invention provides a composition that is quickly and readily mixed with a resin, solvent or oil, to form an ink system, with simple agitation and no required milling, furnishing a finished ink that is ready to use. The invention provides a composition having a high loading (approximately 90–95%) of pigment. This loading is much higher than prior art compositions, and thus furnishes the ultimate user with an economical source of pigment. Also, the present composition has been densified sufficiently to avoid the dust frequently encountered when mixing a prior art dry pigment composition with a solvent ink system. The present invention allows a printer to maintain a reasonable inventory of various dry predispersed coated pigments, separate from the various ink systems, with the various components being easily mixed to furnish the desired printing ink, without maintaining a large, expensive, cumbersome and inefficient inventory of prepared inks. Further, the printer does not need a 3-roll mill to incorporate the dry pigment of this invention into the solvent ink system, as is common with prior art pigments.

SUMMARY OF THE INVENTION

Our invention is a dry predispersed coated pigment composition comprising
a. a majority of an organic or inorganic pigment and
b. a minority of a hydrocarbon fossil resin.

The invention includes a process for mixing said pigment with said resin and then fusing and fluid energy milling the mixture, to prepare a dry predispersed coated pigment that is suitable for simple mixing with an resin, oil, drier, and solvent system to give a ready-to-use printing ink. A further embodiment of the invention includes densifying or beading the mixture before mixing it with different systems.

DETAILED DESCRIPTION OF THE INVENTION

The invention concerns a dry predispersed coated pigment composition. "Dry" means a substantial absence of water or other solvent such as is found in many prepared or master batch ink compositions. "Predispersed" means that additional milling or grinding is not necessary prior to, concurrent with, or following the addition of a suitable ink system in order to have a ready-to-use printing ink. Such a printing ink is easily prepared from the product of this invention by simple mixing or agitation with the chosen ink system. "Coated" broadly means a thin coating of resin on the pigment, to make it more easily dispersible in different systems, such as inks, paints and plastics. "Pigment" broadly encompasses any of the powdered solid substances normally used in the industry for coloring, opacifying, or otherwise modifying a specific property of the formulation or finished composition in which the pigment is employed. These powdered substances include both inorganic and organic pigments, such as inorganic prime pigments, organic prime pigments, various inert and extended prime pigments and various amorphous carbon blacks. Exemplary of the commonly used general classes of organic pigments are: (a) the azo pigments, such as toluidine red and para reds; (b) triphenylmethane pigments, such as malachite green; (c) xanthene pigments, such as rhodamines; (d) thiazole pigments; (e) quinoline pigments; (f) anthraquinone pigments; and (g) various phthalocyanines. The inorganic pigments are likewise represented by oxides of zinc, lead and titanium, the ferrocyanide blue pigments, the yellow chromates, various green pigments comprising mixtures of a chromate yellow and a ferrocyanide blue, generally referred to as chrome green, cadmium pigments and the various iron oxides. The carbon blacks are generally classified in terms of the process by which they are made, such as channel, furnace, thermal and lamp black. The above pigments can all be readily prepared in particulate form having a suitable particle size. Typically, the particle size of carbon black ranges from about 10 m$\mu$ to about 100 m$\mu$, while iron oxide particles vary from about 0.1$\mu$ to about 4.0$\mu$. The particle sizes of other pigments generally fall between those of carbon black and iron oxide.

The hydrocarbon fossil resin disclosed herein is different from and not to be confused with other resins, such as coal tar hydrocarbon resin, petroleum hydrocarbon resin, or terpene resin. The selected resin is a low molecular weight natural hydrocarbon fossil resin, commercially available by extraction from coal. Many other resins, such as Atlanite 18 (hydrocarbon resin from Atlantic Refining Co.), Zonarez (terpene type from Arizona Chemical Co.), Sucrose benzoate (Velsicol Chemical Co.) and Pentalyn K (pentaerythritol + rosin, from Hercules) were tried in attempts to prepare a pigment-resin combination that would have properties superior to prior art products, but the disclosed hydrocarbon fossil resin (more fully described in Example I) was suitable for the invention.

In the disclosed pigment composition, there is a majority of the chosen organic or inorganic pigment. More particularly, the amount of pigment in the composition ranges from about 85 to about 99.5%wt. of the total composition. And the majority of a hydrocarbon fossil resin includes a range of from about 0.5 to about 15% wt. resin. Preferably, the amount of pigment ranges from about 90 to about 97.5% wt., and the amount of resin ranges from about 2.5 to about 10% wt., based on the total pigment composition.

The particle size distribution of the chosen pigment is typically that found in the commercially available product. It is recognized that the particle size distribution of an iron oxide pigment is different from the particle size distribution of a carbon black pigment, and therefore, specified ranges are difficult to define. The particle size distribution of the hydrocarbon fossil resin is not of great importance, since the resin melts and then coats the pigment particles.

The chosen pigment and the fossil resin are mixed together, with sufficient agitation to assure good mixing.

The mixture is then heated, with agitation, to a temperature of about 380°–420° F. It has been found that, at a temperature less than 380° F., the resin does not melt completely and smoothly, and thus, does not coat the pigment satisfactorily. And at temperatures much in excess of 420° F., the fossil resin tends to agglomerate, forming globs or islands which do not mix well with the pigment and which lead to imperfections in the finished printing coating. Preferably, the heating temperature ranges from about 390° to about 410° F. The mixing time can vary, depending upon the temperature and amount of solids to be mixed, but the mixing-heating step is carried out until the pigment has a satisfactory coating of resin. The process of the invention produces a surface-coated pigment that falls in the dry, surface-treated pigment category. The product is not only more dispersible (as are many treated pigments) but is very dispersible, requiring very low shear for incorporation in ink and other systems. Thus, this product is different from other surface-treated pigments.

Next, the mixture is cooled to about ambient temperature, and the cooled, powdery mixture is milled or ground until the particle size approximates that of the original powdered organic or inorganic pigment. This grinding or milling step is carried out so that the pigment composition can be mixed with the solvent ink sustem using approximately the same conditions required for mixing the original pigment with the ink system. This allows the end user of the pigment composition to prepare the printing ink for end use with a minimum of extra equipment or unusual mixing time. Fluid energy milling is one method of milling the cooled mixture to the desired size.

Although not a necessary step of the invention, it has been found preferable to densify the ground mixture to a density approximating that of the original organic or inorganic pigment, so that the densified mixture can be handled and mixed with the ink system using conditions and equipment similar to those used in handling the original pigment. There are several ways to compress or densify the ground mixture, such as by using compressing machines or densifiers known to the carbon black industry. The ground mixture can also be beaded, for ease of handling and processing. Beading is particularly desirable for treated carbon black that is to be used in ink systems, but other treated pigment mixtures can also be beaded.

EXAMPLE I

GENERAL PROCEDURE

A high temperature, low molecular weight, natural fossil hydrocarbon resin, commercially available by solvent-extracting certain coals, was fluid energy milled. The resin has an average molecular weight of about 750, an acid number of 6–8, a softening point (R&B) of 180°–190° C., a Wijs iodine value of 140–150, a specific gravity of 1.03–1.06, a refractive index of 1.544, virtually no odor, is generally unaffected by alkalies, is soluble in aliphatic and aromatic hydrocarbons and insoluble in water, alcohols, ketones and esters, and has a typical chemical analysis of H = 11.00%
C = 87.04
N = 0.96
S = 0.30
ash = 0.50
halogen = negative
phosphorus = negative After sufficient milling of the resin to give a particle size of about 100–325 mesh, 10 parts by weight of the resin were mixed with 90 parts by weight of carbon black (Raven 1000 - a carbon black produced by Cities Service Co.) in a porcelain ball mill container. The jar was then externally heated, while rolling, for about one-half hour, until the internal temperature reached 400° F. The temperature was maintained at 400° F. for about 10 minutes, and the mixture was then cooled to ambient temperature, or slightly warmer. The mixture was then fluid energy milled, on an HD mill or a Philadelphia FEM, until the particle size approximated that of the original pigment.

The milled product was then densified, to improve wettability, compared with the fluffy powder from the mill. The original carbon black had a density of about 13/ft.$^3$, and the densified pigment had a density of about 13/ft.$^3$. Carbon black that has been beaded can have a density of from about 20 to about 30/ft.$^3$.

The milled and densified product was then tested in various ink vehicles. One such formulation was:

20% Treated Carbon Black
80% Isophthalic Alkyd (Superior 9903-Superior Company)

The ingredients were mixed on a Cowles HSI Disperser (mixer) at 6000 rpm, for varying lengths of time, and the finished ink was then tested on a PC (Paint Club) gauge. Various mixing times, and the resultant PC gauge readings, are given below:

|  | 3 min. | 6 min. | 9 min. | 12 min. |
| --- | --- | --- | --- | --- |
| PC reading | 8.0 | 8.5 | 9.0 | 9.3 |

Since a PC reading of approximately 5–6, using prior art compositions, shows good dispersibility and printability, the above results show that the predispersed pigment of the invention is readily mixed with the vehicle after 3 minutes time.

EXAMPLE 2

In contrast to the PC results obtained above, when untreated carbon black, having approximately the same particle size distribution and the same density, was mixed with the same alkyl vehicle in the same proportions as above, the best results were:

|  | 3 min. | 6 min. | 9 min. | 12 min. |
|---|---|---|---|---|
| PC reading | 0.5 | 2.3 | 2.5 | 4.2 |

In this experiment, even after 12 minutes of mixing, the PC reading of 4.2 was below the acceptable range of 5–6, showing that the untreated carbon black did not disperse easily in the vehicle and that additional mixing energy and time would be necessary to obtain a desirable finished ink.

EXAMPLE 3

Using the procedure of Example 1, carbon black (Raven 1000-Cities Service Co.) was divided into 2 parts - one part was used "as is" (and labeled "control"), while the other part was treated according to the invention. These pigments were mixed in various typical vehicles, using a Cowles HSI Disperser, and the resultant ink formulations were tested on a PC gauge. The results are shown below:

|  |  | PC Reading | | | |
|---|---|---|---|---|---|
|  |  | 3 min. | 6 min. | 9 min. | 12 min. |
| (A) | 15% Carbon black in Linseed Oil (a) | | | | |
|  | Control | 1.5 | 1.6 | 3.0 | 4.5 |
|  | According to the Invention | 5.5 | 5.9 | 5.9 | 6.2 |
| (B) | 20% Carbon black in Quickest Ink (b) | | | | |
|  | Control | 1.5 | 4.2 | 4.2 | 5.5 |
|  | According to the Invention | 4.5 | 5.2 | 7.2 | 8.0 |
| (C) | 20% Carbon black in Isophthalic alkyd (c) | | | | |
|  | Control | 0.5 | 2.3 | 2.5 | 4.2 |
|  | According to the Invention | 8.0 | 8.5 | 9.0 | 9.3 |
| (D) | 20% Carbon black in Heatset Ink (d) | | | | |
|  | Control | 0.5 | 0.5 | 0.5 | 1.0 |
|  | According to the Invention | 3.3 | 4.5 | 5.0 | 5.0 |

(a)ALV Litho 3 bodied linseed varnish - American Litho Varnish Co.
(b)80% vehicle formed from:
30% Lawter 100-S oil resin - Lawter Co.
40% ALV-2570 varnish - American Litho Varnish Co.
5.5% Chemical Solvents 10-550 Solvent - Chemical Solvents Co.
3% Texalon Antiscuff agent - Lawter Co.
1% Cobalt naphthenate drier
0.5% manganese naphthenate drier
(c)Superior 9907 Isophthalic alkyd - Superior Co.
(d)80% vehicle formed from:
55% Thermex A6E varnish - Lawter Co.
5% Terlon No. 3-TP alkyd - Lawter Co.
6% 10-500 ink oil - Ashland Chemical Co.
3% Texalon Antiscuff agent - Lawter Co.
10% Gulf 581 Oil - Gulf Oil Co.
0.5% Drier-6% cobalt - Nuodex
0.5% Eugenol Antiskin agent - Unger Chemical Co.

The above results show that, in various vehicles and formulations, the pigment (carbon black) treated according to the invention dispersed faster and more readily into the vehicle than did the untreated pigment of the prior art. This better dispersibility makes the finished ink of the present invention more readily available, by relatively simple mixing, as compared with the additional time and expense needed for milling of the prior art pigment.

EXAMPLE 4

Phthalocyanine blue pigment was treated according to the invention. 90% pigment and 10% natural fossil resin were mixed and heated to 400° F. for 10 minutes, at temperature. The coated pigment was then cooled and milled to give a particle size distribution approximating that of the pigment "as received". Then, 20% of the treated pigment was mixed with 80% isophthalic alkyd vehicle, using a Cowles HSI mixer. A similar mixture was made using untreated pigment. After 12 minutes of mixing, the control sample had an undesirable PC reading of 0.0 (showing practically no dispersion and mixing), while the treated pigment had a PC reading of 6.2

EXAMPLE 5

Iron oxide pigment (Cities Service Mapico 297) was treated as in previous experiments, using 90% pigment and 10% fossil resin and heated to 400° F. for 10 minutes. Then, 20% of the cooled and milled material was mixed with 80% isophthalic alkyd, and a similar mixture was formed using untreated iron oxide (Mapico 297). After 12 minutes mixing, for each formulation, on a Cowles HSI mixer, the control (untreated) sample had an undesirable PC reading of 0.0 (showing practically no dispersion of the pigment into the vehicle), while the treated oxide pigment had a PC reading of 9.0. This example dramatically shows the better dispersibility of a pigment treated according to the invention.

EXAMPLE 6

Using the procedure of Ex. 4, but substituting benzidine yellow AAA for the phthalocyanine blue, the PC reading of the untreated control was 0.0, showing no dispersion. The treated pigment, after 3 minutes of mixing, had a PC reading of 5.0.

OTHER EXAMPLES

Additional experiments were made to determine the approximate limits of the pigment/fossil resin mixture that would result in a usable and desirable treated pigment. Since carbon black is typically the most difficult pigment to disperse in a vehicle, it was chosen as the test pigment.

At a 98/2 pigment/resin ratio, the treated pigment was acceptably dispersed after 3 minutes mixing, but a higher PC reading was obtained after 12 minutes mixing. A satisfactory PC reading was also obtained using a 99.5/0.5 pigment/resin ratio. Using an 85/15 ratio, a satisfactory PC reading was obtained after 3 minutes of mixing, with the 85/15 3-minute reading being higher than the 98/2 3-minute PC reading.

Titanium dioxide, zinc oxide, chromium oxide, cadmium sulfide, yellow chromate, ferrocyanide blue and lead oxide pigments, upon treatment with a fossil resin according to the invention, also give materials that are more easily dispersed in ink vehicles than are the pigments, either untreated or using prior art methods. Similarly, organic pigments, such as phthalocyanine, naphthol, azo, benzidine, quinacridone, indanthrene, rhodamine, vat, para, pyrazolon, lithol, and indigo, when treated according to the invention, give products that are more readily dispersed in ink vehicles than are untreated pigments.

In a test on commercial milling equipment, a predispersed carbon black pigment of the invention, formulated in a Heatset system, gave a dispersibility after one pass on a 3-roll mill that was equal to the dispersibility obtained after 3 passes on a 3-roll mill for an untreated carbon black-vehicle mixture.

To illustrate the uniqueness of the hydrocarbon natural fossil resin used in the invention, the listing below shows examples of prior art materials that gave unacceptable PC values with a pigment selected from carbon black, iron oxide, and benzidine yellow, and processed according to the procedure detailed above:

soybean lecithin, modified resin, chlorinated polyphenyl, naphthenic acid, dioctyl phthalate, bodied linseed oil, low molecular weight polyethylene, rosin ester, mineral oil, alkyl-polyester resin, creosote oil, morpholine, sucrose octabenzoate, polyvinylpyrrolidone, high boiling aliphatic solvent, melamine resin, methyl ester of hydrogenated rosin, and sodium lauryl sulfate.

While the present invention has been described herein with reference to particular embodiments thereof, it will be appreciated by those skilled in the art that various changes and modifications can be made without departing from the scope of the invention as set forth.

We claim:

1. A dry, predispersed, coated pigment composition comprising:
   a. a majority, varying from about 85 to 99.5 wt. %, of an organic or inorganic pigment, and
   b. a minority, varying from about 0.5 to 15 wt.%, of a natural hydrocarbon fossil resin, the wt.percents being based on the weight of the finished pigment composition.

2. The pigment composition of claim 1, wherein the pigment varies from about 90 to 97.5 weight percent, based on the finished composition and the resin varies from about 2.5 to 10 weight percent, based on the finished composition.

3. The composition of claim 1, in which the resin component is a high temperature, low molecular weight, natural hydrocarbon fossil resin, extracted from coal.

4. The method of preparing a dry predispersed coated pigment composition comprising:
   a. mixing a powdered organic or inorganic pigment with a powdered natural hydrocarbon fossil resin,
   b. heating, with agitation, the mixture to a temperature of about 380–420° F., until the pigment has a coating of resin,
   c. cooling the mixture to about ambient temperature, and
   d. grinding the cooled powdery mixture to a particle size approximating that of the original powdered organic or inorganic pigment.

5. The method of claim 4, including further densifying of the ground mixture of step (d) to a density approximating that of the original organic or inorganic pigment.

6. The method of claim 4, wherein the step (b) heating temperature is between about 390 and 410° F.

7. The method of claim 4, wherein the pigment varies from about 85 to about 99.5 weight percent, based on the weight of the finished pigment, and the resin varies from about 0.5 to about 15 weight percent.

8. The method of claim 4, including beading of the ground mixture of step (d).

* * * * *

PO-1050
(5/69)

UNITED STATES PATENT OFFICE
CERTIFICATE OF CORRECTION

Patent No. 4,007,051      Dated 2/8/77

Inventor(s) Oscar J. Gombar et al.

It is certified that error appears in the above-identified patent and that said Letters Patent are hereby corrected as shown below:

Column 1, line 6, change "1974" to --1975--. Column 2, line 65, change "majority" to --minority--. Column 4, lines 35 and 36, change "13/ft$^3$" to --13#/ft$^3$--. Column 4, line 37, change "30/ft$^3$" to --30#/ft$^3$--.

Signed and Sealed this

Third Day of May 1977

[SEAL]

Attest:

RUTH C. MASON
*Attesting Officer*

C. MARSHALL DANN
*Commissioner of Patents and Trademarks*